United States Patent
Fair et al.

(10) Patent No.: US 7,321,962 B1
(45) Date of Patent: *Jan. 22, 2008

(54) TECHNIQUE FOR TRANSLATING A HYBRID VIRTUAL VOLUME FILE SYSTEM INTO A PURE VIRTUAL FILE SYSTEM DATA STREAM

(75) Inventors: Robert L. Fair, Cary, NC (US); Ashish Prakash, Morrisville, NC (US); Eric Hamilton, Durham, NC (US); John K. Edwards, Sunnyvale, CA (US); Robert M. English, Menlo Park, CA (US)

(73) Assignee: Network Appliance, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/703,380

(22) Filed: Feb. 7, 2007

(51) Int. Cl.
*G06F 12/00* (2006.01)

(52) U.S. Cl. .................. 711/202; 711/203; 711/209; 718/1

(58) Field of Classification Search .................. None
See application file for complete search history.

(56) References Cited

U.S. PATENT DOCUMENTS

2003/0208463 A1* 11/2003 Vishlitzky et al. ............. 707/1
2005/0114617 A1* 5/2005 Kopylovitz .................. 711/165

* cited by examiner

*Primary Examiner*—Reginald Bragdon
*Assistant Examiner*—Ngoc Dinh
(74) *Attorney, Agent, or Firm*—Cesari and McKenna LLP (57) ABSTRACT

A method for transferring data of a hybrid virtual volume of a computer data storage system from a source to a destination is disclosed. The method first translates intermingled virtual and physical volume block numbers of the hybrid virtual volume into a data stream having only virtual volume block numbers. The method then sends the data stream to a destination computer.

19 Claims, 9 Drawing Sheets

TECHNIQUE FOR TRANSLATING A HYBRID VIRTUAL VOLUME FILE SYSTEM INTO A PURE VIRTUAL FILE SYSTEM DATA STREAM

CROSS-REFERENCE TO RELATED APPLICATIONS

The present invention is related to the following commonly assigned U.S. patent application Ser. Nos. 10/950,893 U.S. Pat. No. 7,243,207 titled: *Technique for Translating a Pure Virtual File System Data Stream into a Hybrid Virtual Volume*, and Ser. No. 10/951,196 Sep. 27, 2004 (U.S. Pat. No. 7,194,595) titled: *Technique for Translating a Hybrid Virtual Volume File System Into a Pure Virtual File System Data Stream*.

FIELD OF THE INVENTION

The present invention relates to storage systems and, more specifically, to transfer of a volume between a source and a destination on either the same storage system or across a network.

BACKGROUND OF THE INVENTION

A storage system typically comprises one or more storage devices into which information may be entered, and from which information may be obtained, as desired. The storage system includes a storage operating system that functionally organizes the system is by, inter alia, invoking storage operations in support of a storage service implemented by the system. The storage system may be implemented in accordance with a variety of storage architectures including, but not limited to, a network-attached storage environment, a storage area network and a disk assembly directly attached to a client or host computer. The storage devices are typically disk drives organized as a disk array, wherein the term "disk" commonly describes a self-contained rotating magnetic media storage device. The term disk in this context is synonymous with hard disk drive (HDD) or direct access storage device (DASD).

Storage of information on the disk array is preferably implemented as one or more storage "volumes" of physical disks, defining an overall logical arrangement of disk space. The disks within a volume are typically organized as one or more groups, wherein each group may be operated as a Redundant Array of Independent (or Inexpensive) Disks (RAID). Most RAID implementations enhance the reliability/integrity of data storage through the redundant writing of data "stripes" across a given number of physical disks in the RAID group, and the appropriate storing of redundant information (parity) with respect to the striped data. The physical disks of each RAID group may include disks configured to store striped data (i.e., data disks) and disks configured to store parity for the data (i.e., parity disks). The parity may thereafter be retrieved to enable recovery of data lost when a disk fails. The term "RAID" and its various implementations are well-known and disclosed in *A Case for Redundant Arrays of Inexpensive Disks (RAID)*, by D. A. Patterson, G. A. Gibson and R. H. Katz, Proceedings of the International Conference on Management of Data (SIGMOD), June 1988.

The storage operating system of the storage system may implement a high-level module, such as a file system, to logically organize the information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system may also assign each data block in the file a corresponding "file offset" or file block number (fbn). The file system typically assigns sequences of fbns on a per-file basis, whereas vbns are assigned over a larger volume address space. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

A known type of file system is a write-anywhere file system that does not overwrite data on disks. If a data block is retrieved (read) from disk into a memory of the storage system and "dirtied" (i.e., updated or modified) with new data, the data block is thereafter stored (written) to a new location on disk to optimize write performance. A write-anywhere file system may initially assume an optimal layout such that the data is substantially contiguously arranged on disks. The optimal disk layout results in efficient access operations, particularly for sequential read operations, directed to the disks. An example of a write-anywhere file system that is configured to operate on a storage system is the Write Anywhere File Layout (WAFL™) file system available from Network Appliance, Inc., Sunnyvale, Calif.

The write-anywhere file system (such as the WAFL file system) has the capability to generate a snapshot of its active file system. An "active file system" is a file system to which data can be both written and read, or, more generally, an active store that responds to both read and write I/O operations. It should be noted that "snapshot" is a trademark of Network Appliance, Inc. and is used for purposes of this patent to designate a persistent consistency point (CP) image. A persistent consistency point image (PCPI) is a space conservative, point-in-time read-only image of data accessible by name that provides a consistent image of that data (such as a storage system) at some previous time. More particularly, a PCPI is a point-in-time representation of a storage element, such as an active file system, file or database, stored on a storage device (e.g., on disk) or other persistent memory and having a name or other identifier that distinguishes it from other PCPIs taken at other points in time. In the case of the WAFL file system, a PCPI is always an active file system image that contains complete information about the file system, including all metadata. A PCPI can also include other information (metadata) about the active file system at the particular point in time for which the image is taken. The terms "PCPI" and "snapshot" may be used interchangeably through out this patent without derogation of Network Appliance's trademark rights.

The write-anywhere file system supports multiple snapshots that are generally created on a regular schedule. Each snapshot refers to a copy of the file system that diverges from the active file system over time as the active file system is modified. In the case of the WAFL file system, the active file system diverges from the snapshots since the snapshots stay in place as the active file system is written to new disk locations. Each snapshot is a restorable version of the storage element (e.g., the active file system) created at a predetermined point in time and, as noted, is "read-only" accessible and "space-conservative". Space conservative denotes that common parts of the storage element in multiple snapshots share the same file system blocks. Only the differences among these various snapshots require extra storage blocks. The multiple snapshots of a storage element are not independent copies, each consuming disk space; therefore, creation of a snapshot on the file system is instantaneous, since no entity data needs to be copied. Read-only accessibility denotes that a snapshot cannot be modified because it is closely coupled to a single writable image in the active file system. The closely coupled association between a file in the active file system and the same file in a snapshot obviates the use of multiple "same" files. In the example of a WAFL file system, snapshots are described in TR3002 *File System Design for a NFS File Server Appliance* by David Hitz et al., published by Network Appliance, Inc. and in U.S. Pat. No. 5,819,292 entitled *Method for Maintaining Consistent States of a File System and For Creating User-Accessible Read-Only Copies of a File System*, by David Hitz et al., each of which is hereby incorporated by reference as though full set forth herein.

U.S. patent application Ser. No. 10/836,817 titled *Extension of Write Anywhere File System Layout*, by John K. Edwards et al. and assigned to Network Appliance, Inc., describes a file system layout that apportions an underlying physical volume into one or more virtual volumes (vvols) of a storage system. The underlying physical volume is an aggregate comprising one or more groups of disks, such as RAID groups, of the storage system. The aggregate is apportioned into one or more virtual volumes (vvols) of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks. In a hybrid vvol design, these block pointers are pvbns in the aggregate that hosts the vvol, whereas in a dual vbn hybrid vvol design, the block pointers are both pvbns and vvbns. Notably, pvbns reference locations on disks of the aggregate, while vvbns reference locations within files of the vvol.

Transferring such hybrid vvols between source and destination aggregates either on the same storage system or across a network poses the problem of "interpreting" these block pointers on the source and destination, and transforming them into a format that allows the destination to recreate the same vvol in terms of data and snapshots as it existed at the source. Such format transformation means that the appropriate (indirect) block pointers on both the source and destination of an image transfer provide access to exactly the same data blocks. If a hybrid vvol is transferred by simply moving blocks and putting them in place on the destination, data integrity will be violated since the mapping between pvbns on the source and destination is not the same.

Specifically, when performing an image transfer the pvbn indirect block pointers on the source, which reference locations on disks attached to the source, have no meaning on the destination and, in particular, to locations on disks coupled to the destination. The image transfer may be performed in accordance with a volume replication facility and typically comprises a file system data stream that is provided by the source to a destination via image transfer operations, such as volume copying and synchronous or asynchronous mirroring. The image transfer operations typically operate on the granularity of a vvol and transfer all the blocks of a source vvol to a destination vvol on an aggregate of the destination.

The pvbn block pointers in the indirect blocks (or inodes) on the source vvol may not exist on the destination (or may not be available on the destination) for many reasons such as, e.g., when going from a larger aggregate on the source to a smaller aggregate on the destination. Thus, a technique is needed to convert the pvbn block pointers in the indirect blocks on the source into block pointers that "make sense" on the destination.

SUMMARY OF THE INVENTION

The present invention is directed to a technique that translates a hybrid virtual volume (vvol) having a file system that contains intermingled virtual and physical volume block numbers (vbns) into a "pure" stream of virtual vbns (vvbns). The stream of vvbns is illustratively embodied as an output file system data stream of a vvol image that is transferred by a source to a destination in accordance with image transfer operations, such as volume copying and synchronous or asynchronous mirroring. The blocks that are sent as part of the image transfer are selected from a container file of the hybrid vvol on the source. In particular, the invention is directed to a technique for translating physical vbns (pvbns) of a source aggregate on the source to pure vvbns of the output file system data stream that can be used on a destination aggregate of the destination, where embedded pvbns in the source hybrid vvol image are not valid. The technique for translating a hybrid vvol into a pure vvol file system data stream is referred to herein as "source swizzling".

The output file system stream comprises repeated sets of header and data (vvol) blocks. Each header block contains an array of vbn/bits (identifying information) pairs, wherein each vbn/bits pair describes a corresponding vvol block. The vbn field of the identifying information pair contains a volume block number of an associated vvol block within the vvol image, while the bits field stores block type and level bits for the associated vvol block. Thus, the file system data stream is essentially a sequential stream of information, wherein the first vbn/bits pair corresponds the first vvol block following the header, the second pair corresponds to the second vvol block, etc. The sequential data stream is then sent in this format over the network to the destination in accordance with the image transfer.

Broadly stated, for each block in a selected vvol, the novel source swizzling technique determines whether the block needs processing and, if so, processes the block, constructs the output file system data stream using the processed block and, upon completion of processing of all applicable blocks in the selected vvol, dispatches the stream. Vvol blocks may contain different types of data from the file system including user data blocks, system data blocks (such as map file and directory blocks), indirect file tree blocks, inode file blocks (containing descriptions of files in the file system), file system information (fsinfo) blocks and volume information (volinfo) blocks. Any of these blocks, except user data blocks and system data blocks, may contain pvbns that in hybrid vvols need to be translated (processed) to vvbns prior to dispatch. Source swizzling uses different detection mechanisms, and different processing, depending on the type of block. For example, indirect blocks are detected by checking the associated file level as non-zero in the block type and level bit mask.

Advantageously, the inventive technique removes intermingling of pvbns and vvbns from a volume (vvol) to thereby generate a pure stream of volume blocks that may be further processed by the destination. The invention additionally provides to the destination information about each block to aid in that processing. Moreover, optimizations such as block type and level bits cache and block-based physical to virtual vbn conversion ensure high efficiency.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
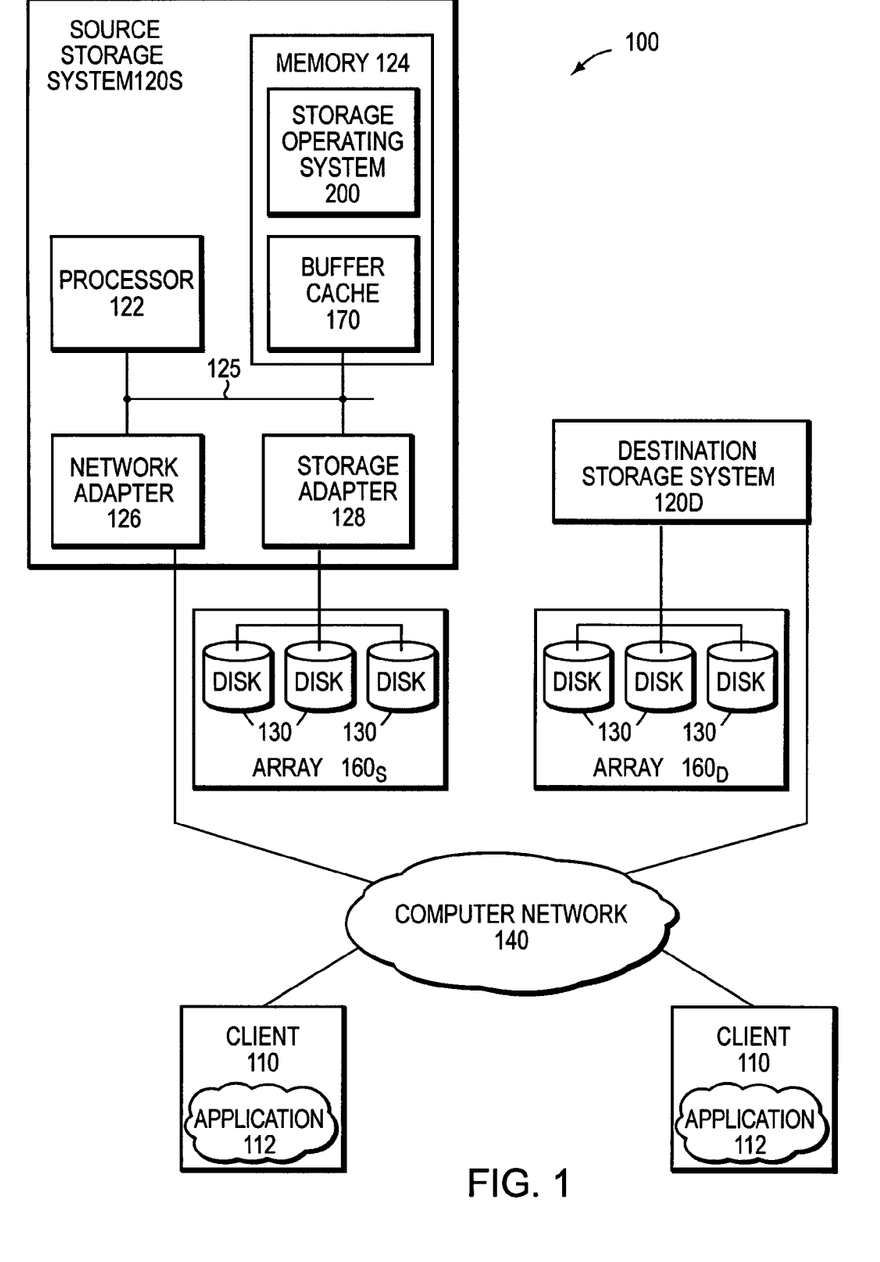
FIG. 1 is a schematic block diagram of a computer network including a plurality of storage systems that may be advantageously used with the present invention.

FIG. 1 is a schematic block diagram of a network environment 100 including a plurality of storage systems 120, such as source storage system $120_S$ and destination storage system $120_D$, that may be advantageously used with the present invention. Each storage system is a computer that provides storage service relating to the organization of information on storage devices, such as disks 130 of a disk array $160_{S,D}$. Each storage system $120_{S,D}$ comprises a processor 122, a memory 124, a network adapter 126 and a storage adapter 128 interconnected by a system bus 125. The storage system 120 also includes a storage operating system 200 that preferably implements a high-level module, such as a file system, to logically organize the information as a hierarchical structure of directories, files and special types of files called virtual disks (hereinafter "blocks") on the disks.

In the illustrative embodiment, the memory 124 comprises storage locations that are addressable by the processor and adapters for storing software program code. A portion of the memory may be further organized as a "buffer cache" 170 for storing data structures associated with the present invention. The processor and adapters may, in turn, comprise processing elements and/or logic circuitry configured to execute the software code and manipulate the data structures. Storage operating system 200, portions of which are typically resident in memory and executed by the processing elements, functionally organizes the system 120 by, inter alia, invoking storage operations executed by the storage system. It will be apparent to those skilled in the art that other processing and memory means, including various computer readable media, may be used for storing and executing program instructions pertaining to the invention described herein.

The network adapter 126 comprises the mechanical, electrical and signaling circuitry needed to connect the storage system 120 to one of a plurality of clients 110 over a computer network 140, which may comprise a point-to-point connection or a shared medium, such as a local area network. Illustratively, the computer network 140 may be embodied as an Ethernet network or a Fibre Channel (FC) network. Each client 110 may communicate with the storage system over network 140 by exchanging discrete frames or packets of data according to pre-defined protocols, such as the Transmission Control Protocol/Internet Protocol (TCP/IP).

The client 110 may be a general-purpose computer configured to execute applications 112. Moreover, the client 110 may interact with the storage system 120 in accordance with a client/server model of information delivery. That is, the client may request the services of the storage system, and the system may return the results of the services requested by the client, by exchanging packets over the network 140. The clients may issue packets including file-based access protocols, such as the Common Internet File is System (CIFS) protocol or Network File System (NFS) protocol, over TCP/IP when accessing information in the form of files and directories. Alternatively, the client may issue packets including block-based access protocols, such as the Small Computer Systems Interface (SCSI) protocol encapsulated over TCP (iSCSI) and SCSI encapsulated over Fibre Channel (FCP), when accessing information in the form of blocks.

The storage adapter 128 cooperates with the storage operating system 200 executing on the system 120 to access information requested by a user (or client). The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on the disks 130, such as HDD and/or DASD, of array $160_{S,D}$. The storage adapter includes input/output (I/O) interface circuitry that couples to the disks over an I/O interconnect arrangement, such as a conventional high-performance, FC serial link topology.

Storage of information on each array $160_{S,D}$ is preferably implemented as one or more storage "volumes" that comprise a collection of physical storage disks 130 cooperating to define an overall logical arrangement of volume block number (vbn) space on the volume(s). Each logical volume is generally, although not necessarily, associated with its own file system. The disks within a logical volume/file system are typically organized as one or more groups, wherein each group may be operated as a Redundant Array of Independent (or Inexpensive) Disks (RAID). Most RAID implementations, such as a RAID-4 level implementation, enhance the reliability/integrity of data storage through the redundant writing of data "stripes" across a given number of physical disks in the RAID group, and the appropriate storing of parity information with respect to the striped data. An illustrative example of a RAID implementation is a RAID-4 level implementation, although it should be understood that other types and levels of RAID implementations may be used in accordance with the inventive principles described herein.

To facilitate access to the disks 130, the storage operating system 200 implements a write-anywhere file system that cooperates with virtualization modules to "virtualize" the storage space provided by disks 130. The file system logically organizes the information as a hierarchical structure of named directories and files on the disks. Each "on-disk" file may be implemented as set of disk blocks configured to store information, such as data, whereas the directory may be implemented as a specially formatted file in which names and links to other files and directories are stored. The virtualization modules allow the file system to further logically organize information as a hierarchical structure of blocks on the disks that are exported as named logical unit numbers (luns).

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system may be enhanced for use in accordance with the inventive principles described herein. As such, where the term "WAFL" is employed, it should be taken broadly to refer to any storage operating system that is otherwise adaptable to the teachings of this invention.

Figure 2:
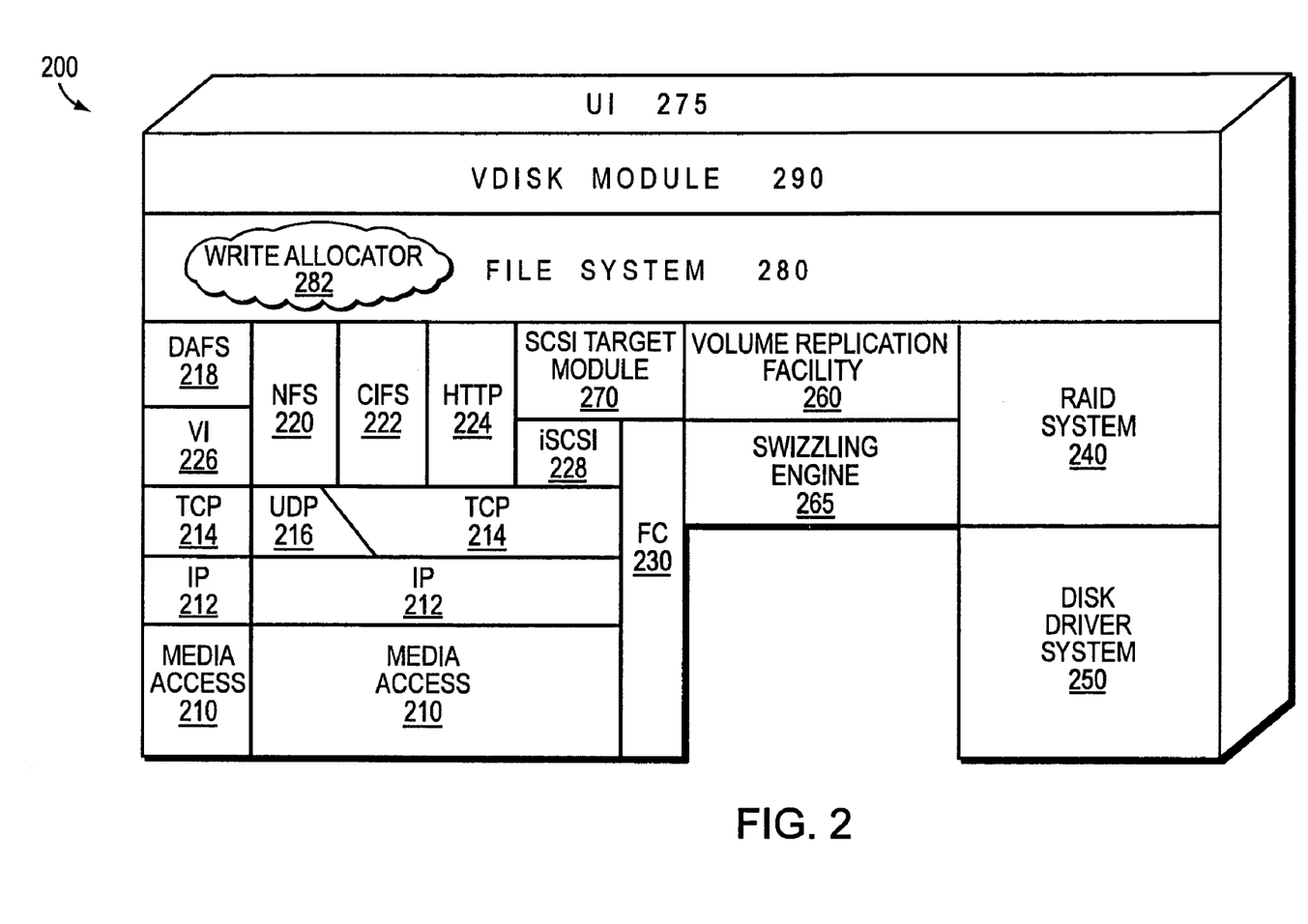
FIG. 2 is a schematic block diagram of a storage operating system that may be advantageously used with the present invention.

FIG. 2 is a schematic block diagram of the storage operating system 200 that may be advantageously used with the present invention. The storage operating system comprises a series of software layers organized to form an integrated network protocol stack or, more generally, a multi-protocol engine that provides data paths for clients to access information stored on the storage system using block and file access protocols. The protocol stack includes a media access layer 210 of network drivers (e.g., gigabit Ethernet drivers) that interfaces to network protocol layers, such as the IP layer 212 and its supporting transport mechanisms, the TCP layer 214 and the User Datagram Protocol (UDP) layer 216. A file system protocol layer provides multi-protocol file access and, to that end, includes support for the Direct Access File System (DAFS) protocol 218, the NFS protocol 220, the CIFS protocol 222 and the Hypertext Transfer Protocol (HTTP) protocol 224. A VI layer 226 implements the VI architecture to provide direct access transport (DAT) capabilities, such as RDMA, as required by the DAFS protocol 218.

An iSCSI driver layer 228 provides block protocol access over the TCP/IP network protocol layers, while a FC driver layer 230 receives and transmits block access requests and responses to and from the storage system. The FC and iSCSI drivers provide FC-specific and iSCSI-specific access control to the blocks and, thus, manage exports of luns to either iSCSI or FCP or, alternatively, to both iSCSI and FCP when accessing the blocks on the storage system. In addition, the storage operating system includes a storage module embodied as a RAID system 240 that manages the storage and retrieval of information to and from the volumes/disks in accordance with I/O operations, and a disk driver system 250 that implements a disk access protocol such as, e.g., the SCSI protocol.

Bridging the disk software layers with the integrated network protocol stack layers is a virtualization system that is implemented by a file system 280 interacting with virtualization modules illustratively embodied as, e.g., vdisk module 290 and SCSI target module 270. The vdisk module 290 is layered on the file system 280 to enable access by administrative interfaces, such as a user interface (UI) 275, in response to a user (system administrator) issuing commands to the storage system. The SCSI target module 270 is disposed between the FC and iSCSI drivers 228, 230 and the file system 280 to provide a translation layer of the virtualization system between the block (lun) space and the file system space, where luns are represented as blocks. The UI 275 is disposed over the storage operating system in a manner that enables administrative or user access to the various layers and systems.

The file system is illustratively a message-based system that provides logical volume management capabilities for use in access to the information stored on the storage devices, such as disks. That is, in addition to providing file system semantics, the file system 280 provides functions normally associated with a volume manager. These functions include (i) aggregation of the disks, (ii) aggregation of storage bandwidth of the disks, and (iii) reliability guarantees, such as mirroring and/or parity (RAID). The file system 280 illustratively implements the WAFL file system (hereinafter generally the "write-anywhere file system") having an on-disk format representation that is block-based using, e.g., 4 kilobyte (kB) blocks and using index nodes ("inodes") to identify files and file attributes (such as creation time, access permissions, size and block location). The file system uses files to store metadata describing the layout of its file system; these metadata files include, among others, an inode file. A file handle, i.e., an identifier that includes an inode number, is used to retrieve an inode from disk.

Broadly stated, all inodes of the write-anywhere file system are organized into the inode file. A file system (fs) info block specifies the layout of information in the file system and includes an inode of a file that includes all other inodes of the file system. Each logical volume (file system) has an fsinfo block that is preferably stored at a fixed location within, e.g., a RAID group. The inode of the inode file may directly reference (point to) data blocks of the inode file or may reference indirect blocks of the inode file that, in turn, reference data blocks of the inode file. Within each data block of the inode file are embedded inodes, each of which may reference indirect blocks that, in turn, reference data blocks of a file.

Operationally, a request from the client 110 is forwarded as a packet over the computer network 140 and onto the storage system 120 where it is received at the network adapter 126. A network driver (of layer 210 or layer 230) processes the packet and, if appropriate, passes it on to a network protocol and file access layer for additional processing prior to forwarding to the write-anywhere file system 280. Here, the file system generates operations to load (retrieve) the requested data from disk 130 if it is not resident "in core", i.e., in the buffer cache 170. If the information is not in the cache, the file system 280 indexes into the inode file using the inode number to access an appropriate entry and retrieve a logical vbn. The file system then passes a message structure including the logical vbn to the RAID system 240; the logical vbn is mapped to a disk identifier and disk block number (disk,dbn) and sent to an appropriate driver (e.g., SCSI) of the disk driver system 250. The disk driver accesses the dbn from the specified disk 130 and loads the requested data block(s) in buffer cache 170 for processing by the storage system. Upon completion of the request, the storage system (and operating system) returns a reply to the client 110 over the network 140.

It should be noted that the software "path" through the storage operating system layers described above needed to perform data storage access for the client request received at the storage system may alternatively be implemented in hardware. That is, in an alternate embodiment of the invention, a storage access request data path may be implemented as logic circuitry embodied within a field programmable gate array (FPGA) or an application specific integrated circuit (ASIC). This type of hardware implementation increases the performance of the storage service provided by storage system 120 in response to a request issued by client 110. Moreover, in another alternate embodiment of the invention, the processing elements of adapters 126, 128 may be configured to offload some or all of the packet processing and storage access operations, respectively, from processor 122, to thereby increase the performance of the storage service provided by the system. It is expressly contemplated that the various processes, architectures and procedures described herein can be implemented in hardware, firmware or software.

As used herein, the term "storage operating system" generally refers to the computer-executable code operable to perform a storage function in a storage system, e.g., that manages data access and may, in the case of a file server, implement file system semantics. In this sense, the ONTAP software is an example of such a storage operating system implemented as a microkernel and including the WAFL layer to implement the WAFL file system semantics and manage data access. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive technique described herein may apply to any type of special-purpose (e.g., file server, filer or multi-protocol storage appliance) or general-purpose computer, including a standalone computer or portion thereof, embodied as or including a storage system 120. An example of a multi-protocol storage appliance that may be advantageously used with the present invention is described in U.S. patent application Ser. No. 10/215,917 titled, *Multi-Protocol Storage Appliance that provides Integrated Support for File and Block Access Protocols*, filed on Aug. 9, 2002. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 3:
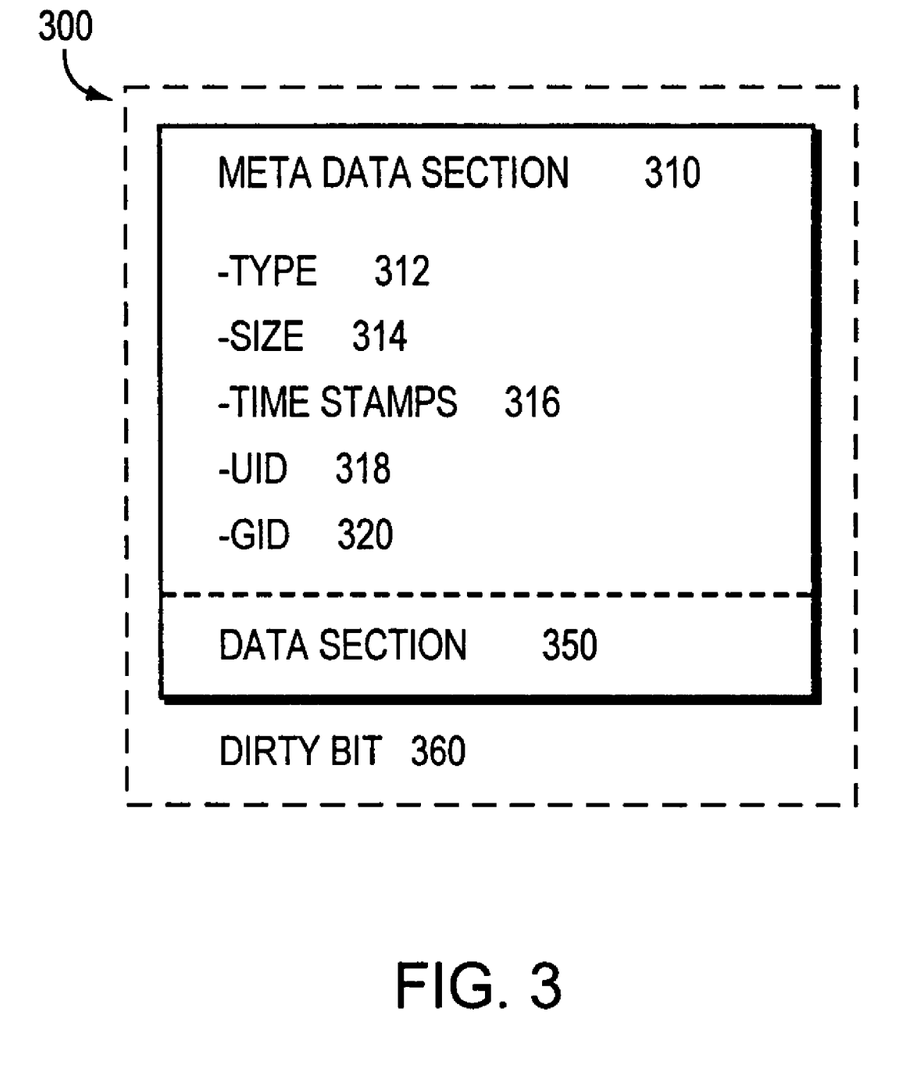
FIG. 3 is a schematic block diagram of an inode that may be advantageously used with the present invention.

In the illustrative embodiment, a file is represented in the write-anywhere file system as an inode data structure adapted for storage on the disks 130. FIG. 3 is a schematic block diagram of an inode 300, which preferably includes a metadata section 310 and a data section 350. The information stored in the metadata section 310 of each inode 300 describes the file and, as such, includes the type (e.g., regular, directory, virtual disk) 312 of file, the size 314 of the file, time stamps (e.g., access and/or modification) 316 for the file and ownership, i.e., user identifier (UID 318) and group ID (GID 320), of the file. The contents of the data section 350 of each inode, however, may be interpreted differently depending upon the type of file (inode) defined within the type field 312. For example, the data section 350 of a directory inode contains metadata controlled by the file system, whereas the data section of a regular inode contains file system data. In this latter case, the data section 350 includes a representation of the data associated with the file.

Specifically, the data section 350 of a regular on-disk inode may include file system data or pointers, the latter referencing 4 kB data blocks on disk used to store the file system data. Each pointer is preferably a logical vbn to facilitate efficiency among the file system and the RAID system 240 when accessing the data on disks. Given the restricted size (e.g., 128 bytes) of the inode, file system data having a size that is less than or equal to 64 bytes is represented, in its entirety, within the data section of that inode. However, if the file system data is greater than 64 bytes but less than or equal to 64 kB, then the data section of the inode (e.g., a first level inode) comprises up to 16 pointers, each of which references a 4 kB block of data on the disk.

Moreover, if the size of the data is greater than 64 kB but less than or equal to 64 megabytes (MB), then each pointer in the data section 650 of the inode (e.g., a second level inode) references an indirect block (e.g., a first level block) that contains 1024 pointers, each of which references a 4 kB data block on disk. For file system data having a size greater than 64 MB, each pointer in the data section 350 of the inode (e.g., a third level inode) references a double-indirect block (e.g., a second level block) that contains 1024 pointers, each referencing an indirect (e.g., a first level) block. The indirect block, in turn, that contains 1024 pointers, each of which references a 4 kB data block on disk. When accessing a file, each block of the file may be loaded from disk 130 into the buffer cache 170.

When an on-disk inode (or block) is loaded from disk 130 into buffer cache 170, its corresponding in core structure embeds the on-disk structure. For example, the dotted line surrounding the inode 300 indicates the in core representation of the on-disk inode structure. The in core structure is a block of memory that stores the on-disk structure plus additional information needed to manage data in the memory (but not on disk). The additional information may include, e.g., a "dirty" bit 360. After data in the inode (or block) is updated/modified as instructed by, e.g., a write operation, the modified data is marked "dirty" using the dirty bit 360 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled *Method for Maintaining Consistent States of a File System and for Creating User-Accessible Read-Only Copies of a File System* by David Hitz et al., issued on Oct. 6, 1998.

Figure 4:
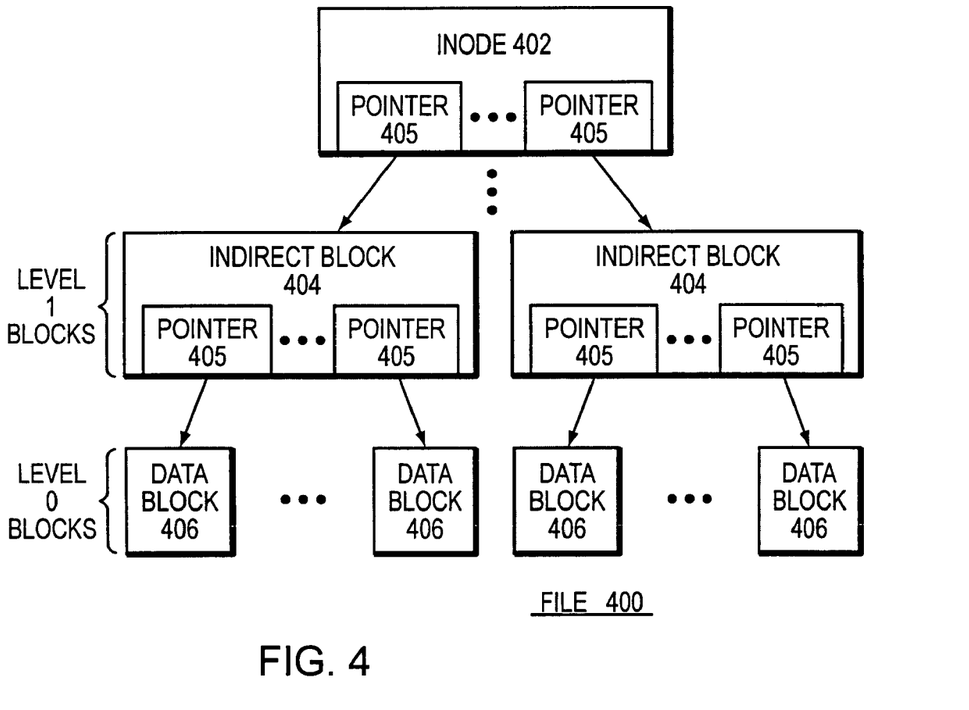
FIG. 4 is a schematic block diagram of a buffer tree of a file that may be advantageously used with the present invention.

FIG. 4 is a schematic block diagram of a buffer tree of a file that may be advantageously used with the present invention. The buffer tree is an internal representation of blocks for a file (e.g., file 400) loaded into the buffer cache 170 and maintained by the write-anywhere file system 280. A root (top-level) inode 402, such as an embedded inode, references indirect (e.g., level 1) blocks 404. Note that there may be additional levels of indirect blocks (e.g., level 2, level 3) depending upon the size of the file. The indirect blocks (and inode) contain pointers 405 that ultimately reference data blocks 406 used to store the actual data of the file. That is, the data of file 400 are contained in data blocks and the locations of these blocks are stored in the indirect blocks of the file. Each level 1 indirect block 404 may contain pointers to as many as 1024 data blocks. According to the "write anywhere" nature of the file system, these blocks may be located anywhere on the disks 130.

A file system layout is provided that apportions an underlying physical volume into one or more virtual volumes (vvols) of a storage system. An example of such a file system layout is described in U.S. patent application Ser. No. 10/836,817 titled *Extension of Write Anywhere File System Layout*, by John K. Edwards et al. and assigned to Network Appliance, Inc., which application is hereby incorporated by reference. The underlying physical volume is an aggregate comprising one or more groups of disks, such as RAID groups, of the storage system. The aggregate has its own physical volume block number (pvbn) space and maintains metadata, such as block allocation structures, within that pvbn space. Each vvol has its own virtual volume block number (vvbn) space and maintains metadata, such as block allocation structures, within that vvbn space. Each vvol is a file system that is associated with a container file; the container file is a file in the aggregate that contains all blocks used by the vvol. Moreover, each vvol comprises data blocks and indirect blocks that contain block pointers that point at either other indirect blocks or data blocks.

In one embodiment, pvbns are used as block pointers within buffer trees of files (such as file 400) stored in a vvol. This illustrative "hybrid" vvol embodiment involves the insertion of only the pvbn in the parent indirect block (e.g., inode or indirect block). Use of pvbns avoids latency associated with translations from vvbns-to-pvbns, e.g., when servicing file system (such as NFS, CIFS) requests. On a read path of a logical volume, a "logical" volume (vol) info block has one or more pointers that reference one or more fsinfo blocks, each of which, in turn, "points to" an inode file and its corresponding inode buffer tree. The read path on a vvol is generally the same, following pvbns (instead of vvbns) to find appropriate locations of blocks; in this context, the read path (and corresponding read performance) of a vvol is substantially similar to that of a physical volume. Translation from pvbn-to-disk, dbn occurs at the file system/ RAID system boundary of the storage operating system 200.

In an alternate "dual vbn hybrid" vvol embodiment, both the pvbn and vvbn are inserted in the parent indirect (e.g., level 1) blocks in the buffer tree of a file, such as file 400. The pvbns reference locations on disks of the aggregate, whereas the vvbns reference locations within files of the vvol. The use of pvbns as block pointers 405 in the indirect blocks 404 provides efficiencies in the read paths, while the use of vvbn block pointers provide efficient access to required metadata. That is, when freeing a block of a file, the parent indirect block in the file contains readily available vvbn block pointers, which avoids the latency associated with accessing an owner map (described herein) to perform pvbn-to-vvbn translations; yet, on the read path, the pvbn is available. A disadvantage of this dual vbn variant is the increased size of indirection data (metadata) stored in each file.

Figure 5:
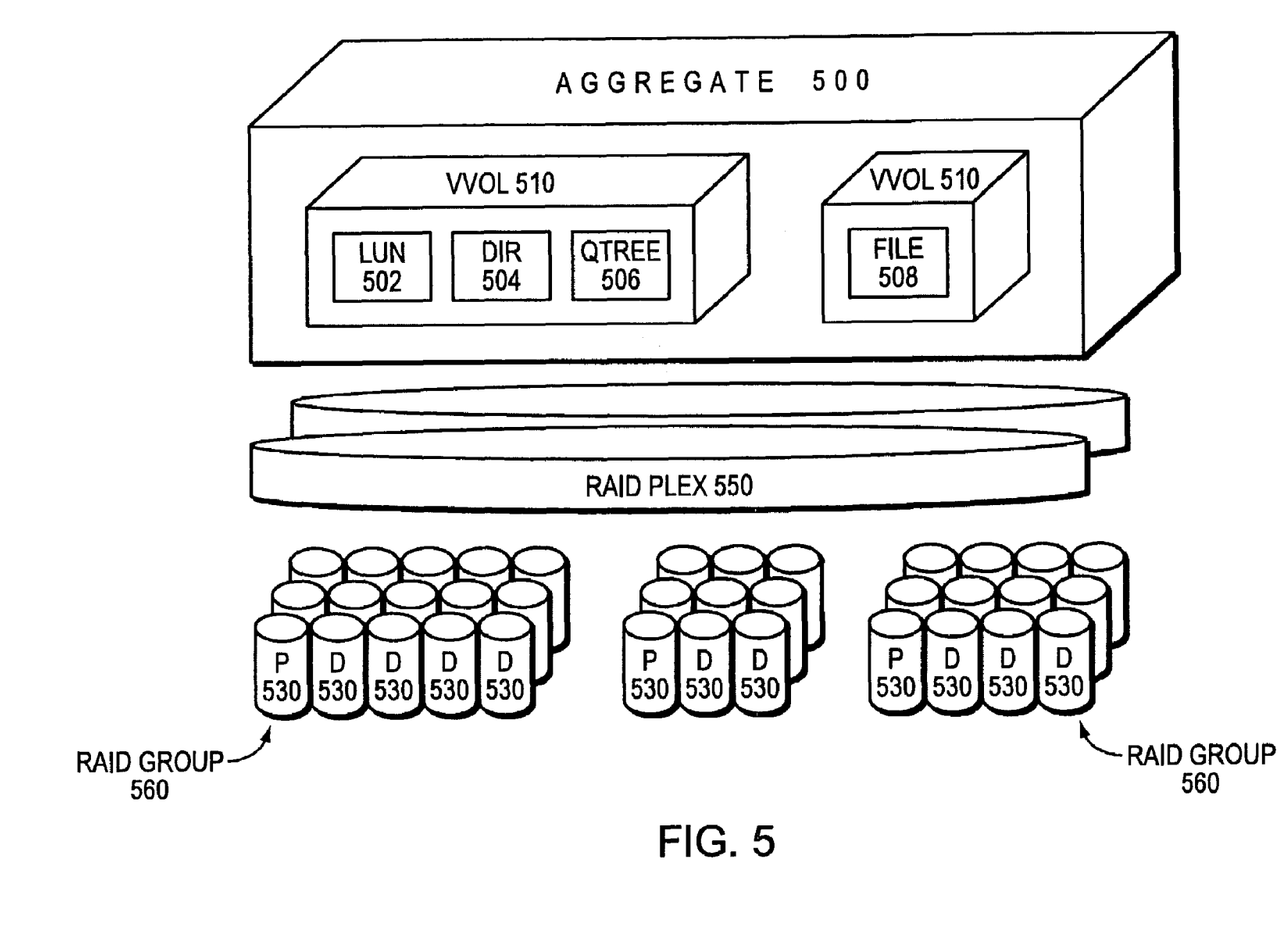
FIG. 5 is a schematic block diagram of an embodiment of an aggregate that may be advantageously used with the present invention.

FIG. 5 is a schematic block diagram of an embodiment of an aggregate 500 that may be advantageously used with the present invention. Luns (blocks) 502, directories 504, qtrees 506 and files 508 may be contained within vvols 510, such as hybrid vvols, that, in turn, are contained within the aggregate 500. The aggregate 500 is illustratively layered on top of the RAID system, which is represented by at least one RAID plex 550 (depending upon whether the storage configuration is mirrored), wherein each plex 550 comprises at least one RAID group 560. Each RAID group further comprises a plurality of disks 530, e.g., one or more data (D) disks and at least one (P) parity disk.

Whereas the aggregate 500 is analogous to a physical volume of a conventional storage system, a vvol is analogous to a file within that physical volume. That is, the aggregate 500 may include one or more files, wherein each file contains a vvol 510 and wherein the sum of the storage space consumed by the vvols is physically smaller than (or equal to) the size of the overall physical volume. The aggregate utilizes a "physical" pvbn space that defines a storage space of blocks provided by the disks of the physical volume, while each embedded vvol (within a file) utilizes a "logical" vvbn space to organize those blocks, e.g., as files. Each vvbn space is an independent set of numbers that corresponds to locations within the file, which locations are then translated to dbns on disks. Since the vvol 510 is also a logical volume, it has its own block allocation structures (e.g., active, space and summary maps) in its vvbn space.

Figure 6:
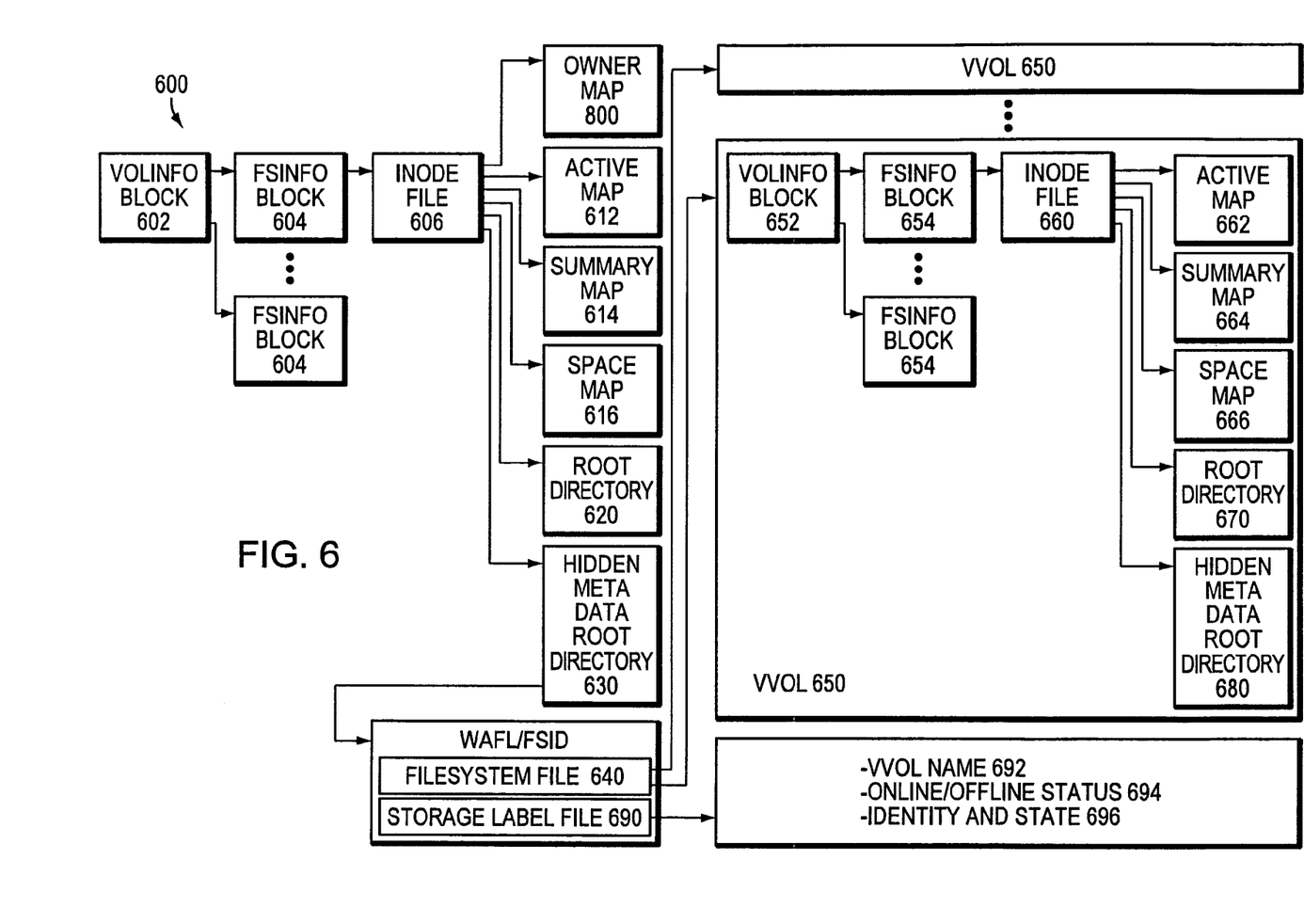
FIG. 6 is a schematic block diagram of an on-disk representation of an aggregate.
Figure 8:
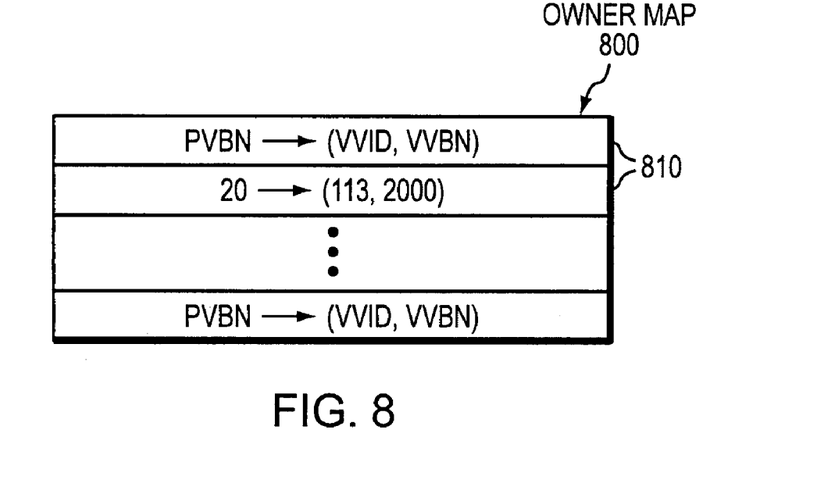
FIG. 8 is a schematic block diagram of an owner map that may be advantageously used with the present invention.

FIG. 6 is a schematic block diagram of an on-disk representation of an aggregate 600. The storage operating system 200, e.g., the RAID system 240, assembles a physical volume of pvbns to create the aggregate 600, with pvbns 1 and 2 comprising a "physical" volinfo block 602 for the aggregate. The volinfo block 602 contains block pointers to fsinfo blocks 604, each of which may represent a snapshot of the aggregate. Each fsinfo block 604 includes a block pointer to an inode file 606 that contains inodes of a plurality of files, including an owner map 800, an active map 612, a summary map 614 and a space map 616, as well as other special metadata files. The inode file 606 further includes a root directory 620 and a "hidden" metadata root directory 630, the latter of which includes a namespace having files related to a vvol in which users cannot "see" the files. The hidden metadata root directory also includes a WAFL/fsid/ directory structure, as described herein, which contains a filesystem file 640 and storage label file 690. Note that root directory 620 in the aggregate is empty; all files related to the aggregate are organized within the hidden metadata root directory 630.

The filesystem file 640 includes block pointers that reference various file systems embodied as vvols 650. The aggregate 600 maintains these vvols 650 at special reserved inode numbers. Each vvol 650 also has special reserved inode numbers within its vvol space that are used for, among other things, the block allocation bitmap structures. As noted, the block allocation bitmap structures, e.g., active map 662, summary map 664 and space map 666, are located in each vvol.

Specifically, each vvol 650 has the same inode file structure/content as the aggregate, with the exception that there is no owner map and no WAFL/fsid/filesystem file, storage label file directory structure in a hidden metadata root directory 680. To that end, each vvol 650 has a volinfo block 652 that points to one or more fsinfo blocks 654, each of which may represent a snapshot of the vvol. Each fsinfo block, in turn, points to an inode file 660 that, as noted, has the same inode structure/content as the aggregate with the exceptions noted above. Each vvol 650 has its own inode file 660 and distinct inode space with corresponding inode numbers, as well as its own root (fsid) directory 670 and subdirectories of files that can be exported separately from other vvols.

The storage label file 690 contained within the hidden metadata root directory 630 of the aggregate is a small file that functions as an analog to a conventional raid label. A raid label includes "physical" information about the storage system, such as the volume name; that information is loaded into the storage label file 690. Illustratively, the storage label file 690 includes the name 692 of the associated vvol 650, the online/offline status 694 of the vvol, and other identity and state information 696 of the associated vvol (whether it is in the process of being created or destroyed).

A container file is a file in the aggregate that contains all blocks used by a vvol. The container file is an internal (to the aggregate) feature that supports a vvol; illustratively, there is one container file per vvol. The container file is a hidden file (not accessible to a user) in the aggregate that holds every block in use by the vvol. As noted, the aggregate includes an illustrative hidden metadata root directory that contains subdirectories of vvols:

WAFL/fsid/filesystem file, storage label file

Figure 7:
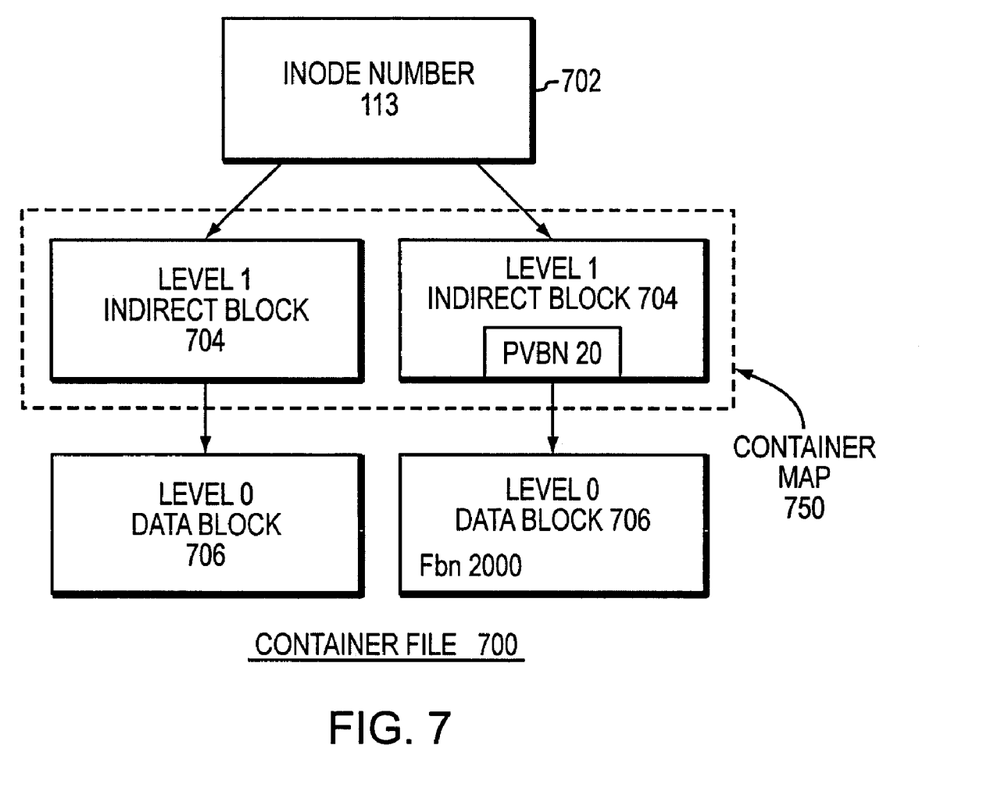
FIG. 7 is a schematic block diagram of a container file that may be advantageously used with the present invention.

Specifically, a "physical" file system (WAFL) directory includes a subdirectory for each vvol in the aggregate, with the name of subdirectory being a file system identifier (fsid) of the vvol. Each fsid subdirectory (vvol) has at least two files, the filesystem file 640 and the storage label file 690. The filesystem file is a large sparse file that contains all blocks owned by a vvol and, as such, is referred to as the container file for the vvol. FIG. 7 is a schematic block diagram of a container file 700 (buffer tree) that is assigned a new type and has an inode 702 that is assigned an inode number equal to a virtual volume id (vvid) of the vvol, e.g., container file 700 has an inode number 113. The container file is essentially one large virtual disk and, since it contains all blocks owned by its vvol, a block with vvbn X in the vvol can be found at fbn X in the container file. For example, vvbn 2000 in a vvol can be found at fbn 2000 in its container file 700. Since each vvol has its own distinct vvbn space, another container file may have fbn 2000 that is different from fbn 2000 in the illustrative container file 700.

Assume that a level 0 block 706 of the container file 700 has an fbn 2000 and an indirect (level 1) block 704 has a block pointer referencing the level 0 block 706, wherein the block pointer has a pvbn 20. Thus, location fbn 2000 of the container file 700 is pvbn 20 (on disk). Notably, the block numbers are maintained at the first indirect level (level 1) of the container file 700; e.g., to locate block 2000 in the container file, the file system layer accesses the 2000$^{th}$ entry at level 1 of the container file and that indirect block provides the pvbn 20 for fbn 2000.

In other words, level 1 indirect blocks of the container file contain the pvbns for blocks in the file and, thus, "map" vvbns-to-pvbns of the aggregate. Accordingly, the level 1 indirect blocks of the container file 700 are configured as a "container map" 750 for the vvol; there is preferably one container map 750 per vvol. The container map provides block pointers from fbn locations within the container file to pvbn locations on disk. Furthermore, there is a one-to-one correspondence between fbn locations in the container file and vvbn locations in a vvol.

While the container map 750 provides a "forward", mapping of vvbn-to-pvbn, an owner map provides a "backward" mapping between pvbn-to-vvbn (and vvid). In particular, mapping metadata of the owner map provides a backward mapping between each pvbn in the aggregate to (i) a vvid that "owns" the pvbn and (ii) the vvbn of the vvol in which the pvbn is located. FIG. 8 is a schematic block diagram of an owner map 800 that may be advantageously used with the present invention. The owner map 800 may be embodied as a data structure having a plurality of entries 810; there is preferably one entry 810 for each block in the aggregate.

In the illustrative embodiment, each entry 810 has a 4-byte vvid and a 4-byte vvbn, and is indexed by a pvbn. That is, for a given block in the aggregate, the owner entry 810 indicates which vvol owns the block and which pvbn it maps to in the vvbn space, e.g., owner entry 810 indexed at pvbn 20 has contents vvid 113 and vvbn 2000. Thus when indexing into the owner map 800 at pvbn 20, the file system 280 accesses a vvol having an inode 113 (which is container file 700) and then accesses block location 2000 within that file. Each entry 810 of the owner map 800 is only valid for blocks that are in use and a vvol only owns those blocks used in the contained file system.

The present invention is directed to a technique that translates a hybrid virtual volume (vvol) having a file system that contains intermingled virtual and physical volume block numbers (vbns) into a "pure" stream of virtual vbns (vvbns). The stream of vvbns is illustratively embodied as an output file system data stream of a vvol image that is transferred by a source storage system $120_S$ ("source") to a destination storage system $120_D$ ("destination") in accordance with image transfer operations, such as volume copying and synchronous or asynchronous mirroring, provided by a volume replication facility. The blocks that are sent as part of the image transfer are selected from a container file of the hybrid vvol on the source. In particular, the invention is directed to a technique for translating physical vbns (pvbns) of a source aggregate on the source to pure vvbns of the output file system data stream that can be used on a destination aggregate of the destination, where embedded pvbns in the source hybrid vvol image are not valid. The technique for translating a hybrid vvol into a pure vvol file system data stream is referred to herein as "source swizzling".

In the illustrative embodiment, the Data ONTAP operating system leverages the WAFL snapshot capability to provide an automated volume replication (duplication) facility 260 called the SnapMirror facility. SnapMirror technology allows asynchronous mirroring of an image (e.g., a data set) between the source and destination to thereby enable, among other things, remote maintenance of consistent copies of the source's data on the destination. As used herein, a data set is defined as one or more storage units, such as vvols, that when combined represent data being served, migrated and/or protected. In this sense, the duplicated data set could include all or part of a file system. In addition, the source is a physical storage system that is serving a client's data set and the destination is the same or different physical storage system functioning as a "target" of a data set being served from the source. The destination may also serve its own independent data set. Examples of techniques for duplicating all or part of a volume (file system) are described in U.S. Pat. No. 6,604,118 titled *File System Image Transfer*, by Kleiman et al, filed Jul. 31, 1998 and U.S. Pat. No. 6,574,591 titled *File System Image Transfer Between Dissimilar File Systems*, by Kleiman et al., filed Oct. 25, 1999, which are hereby incorporated by reference.

In a level 0 block image transfer, all appropriate blocks from the source container file on the source vvol are sent to the destination. On the other hand, a level 1 block image transfer is essentially an incremental transfer wherein only those blocks that have changed are sent to the destination. In accordance with such an image transfer, the volume replication facility 260 may examine snapmaps (i.e., snapshotted copies of the active maps) to determine which blocks are in use in snapshots on the source. That is, the facility may examine differences between the snapmaps to determine which blocks are new and formulates a stream of these blocks for transfer to the destination.

In the illustrative embodiment, a swizzling engine 265 on a source cooperates with the volume replication facility 260 and file system 280 to retrieve selected volume, aggregate or qtree data, and pass that data to a destination via, e.g., a copy to a new device, backup to tape or dispatch over a network. Specifically, when instructed to retrieve a vvol, the volume replication facility 260 cooperates with the file system to load a set of volume blocks from disk into memory, based on snapshot and other information provided by the file system 280. The swizzling engine 265 then cooperates with the replication facility 260 to process (transform) those blocks into a form that is appropriate for dispatch. The transformed blocks are then transferred as an image to the destination by the volume replication facility 260.

Assume it desired to transform a vvol on a source storage system into a pure file system data stream containing vvbns for transfer to a destination storage system in accordance with a volume replication image transfer. The volume replication facility (which may include volume copying, asynchronous or synchronous mirroring) performs computations to determine what blocks should be transferred to the destination. A container file on the source represents the image (vvol) to be transferred. The container file stores blocks (0-N) in a vbn space of the file system. Note that the container file may be representative of a clone vvol; if so the data blocks may reside in a parent vvol of the clone, recursively. Thus, when serializing the clone vvol, a determination is made as to whether each block to be transferred exists in the clone container file. If it does not, then the volume replication facility examines the container file of the parent vvol to determine whether the block exists therein. If the parent vvol is also a clone, this procedure repeats until the appropriate vbn for the actual data block is found. The volume replication facility examines each block (vbn) of the container file to determine whether the block is needed for the image transfer. If not, the next block (vbn) is retrieved; however, if the block is needed, then a transformation (processing) may be required.

The volume replication facility 260 illustratively comprises a plurality of processes or threads within the storage operating system 200 including reader, processor and writer threads. Broadly stated, the reader thread cooperates with the file system to retrieve information associated with each block (from disk) and determines whether that information is needed for the image transfer. If so, the reader passes the information to the processor for processing. The processor thread cooperates with the swizzling engine 265 to perform the transformation (processing) of the information, including any physical-to-virtual mappings. Upon completion of processing (source swizzling), the processor passes the processed information to the writer, where the information is dispatched o to the destination as an output file system data stream. In the case of an image transfer, the writer sends the transformed information over the network to the destination storage system; however, in the case of a backup operation, the transformed information may be sent to a secondary storage device, such as a tape. This organization of threads is configured to send the information in a single direction to a next thread in a "pipeline" manner.

Illustratively, the information passed between each thread assumes the form of a tuple comprising a vbn, a set of bits and a buffer. The vbn is the virtual block number of a block of a vvol (from the container file), the bits are block type and level bits (identifying information) associated with the block and the buffer is a 4 kB buffer storing the actual data of the block. The processor thread and swizzling engine transform the information into a header block comprising a plurality of vbn/bits pairs, as well as a plurality of data blocks.

Figure 9:
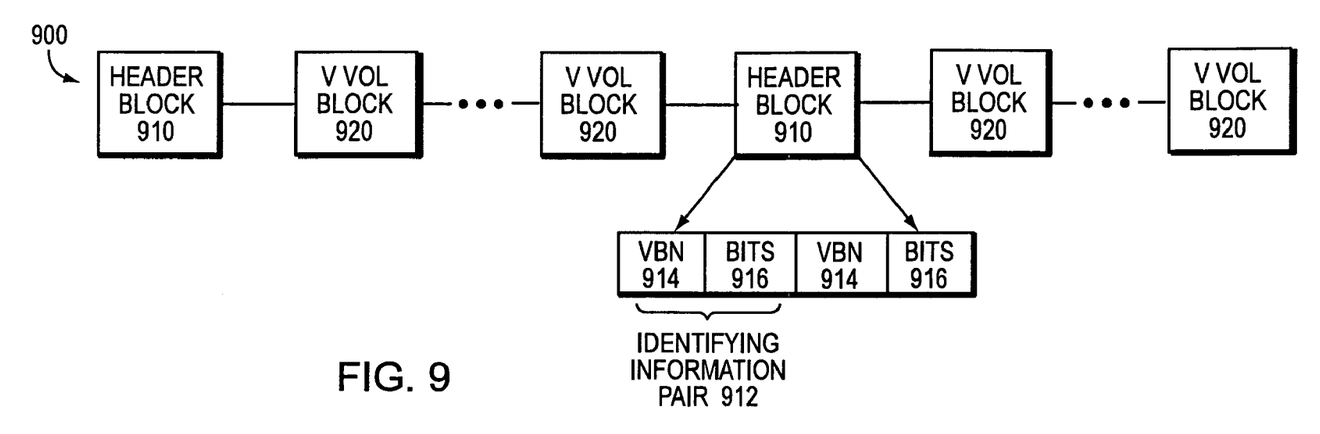
FIG. 9 is a schematic block diagram illustrating a format of an output file system data stream that may be advantageously used with the present invention.

FIG. 9 is a schematic block diagram illustrating the format of the output file system data stream 900 that may be advantageously used with the present invention. The output file system stream 900 comprises repeated sets of header blocks 910 and data (vvol) blocks 920. Each header block 910 contains a plurality of vbn/bits (identifying information) pairs 912, wherein each vbn/bits pair describes a corresponding vvol block. The vbn field 914 of the identifying information pair 912 stores a volume block number of a corresponding vvol block 920 within the vvol image, while the bits field 916 stores block type and level bits for the corresponding vvol block. Thus, the file system data stream is essentially a sequential stream of information, wherein the first vbn/bits pair corresponds the first vvol block following the header, the second pair corresponds to the second vvol block, etc. The sequential data stream is then sent in this format over the network to the destination in accordance with the image transfer.

In the illustrative embodiment, the block type and level bits are embodied as a 32-bit mask of special flags associated with a vvol block and stored (cached) by the file system in a block map file. The block type and level bits encode two pieces of information, (1) the level of a block (level 0 is data, level 1 or more is an indirect block) and (2) a type flag, for example system file or user data. The source swizzling engine 265 uses the block type and level bits to determine the type of processing need for a particular block. The bits are also transmitted in each header block to allow the destination to perform any special processing that may be necessary. The source swizzling technique involves loading the block type and level bit flags from the file system for each vvol block, as well as a read ahead cache bit to improve performance.

Figure 10:
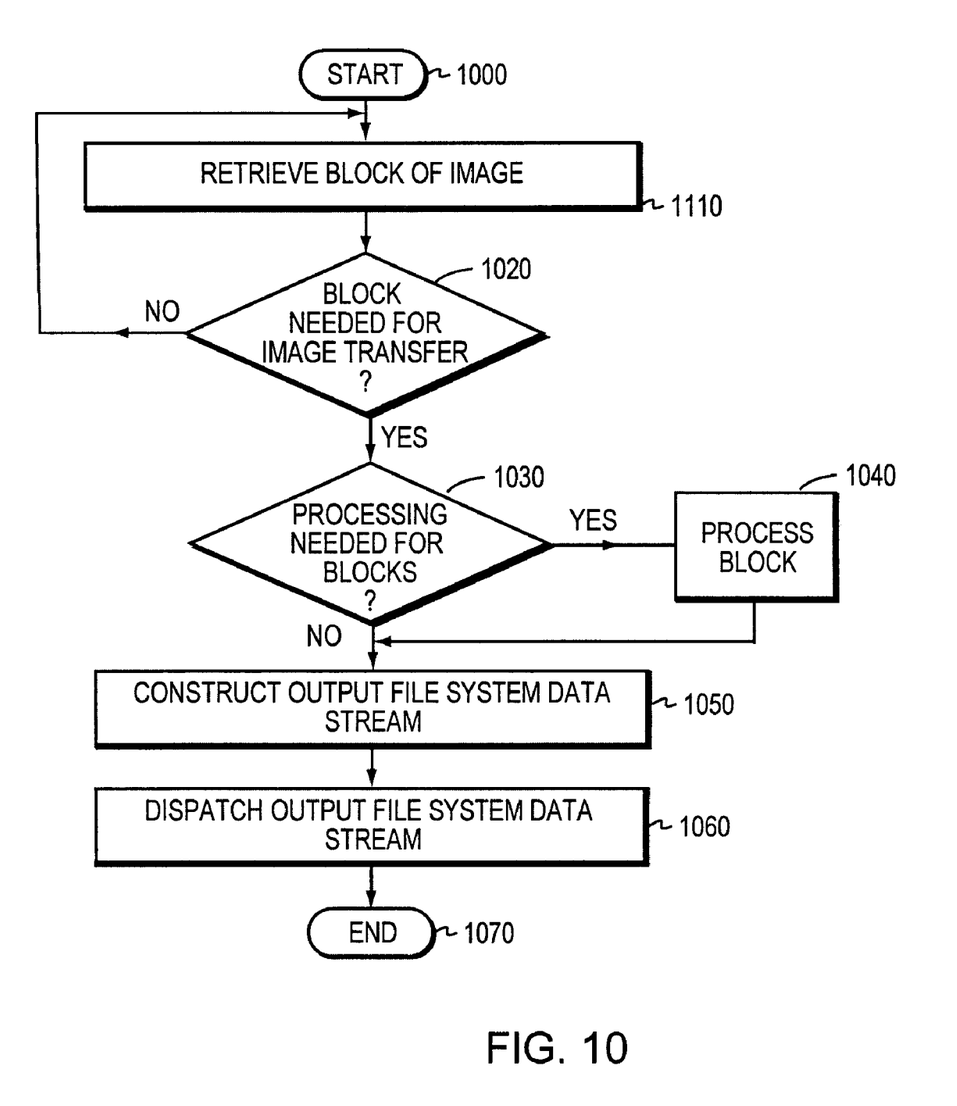
FIG. 10 is a flowchart illustrating a procedure for translating a hybrid vvol into a pure file system data stream in accordance with the source swizzling technique of the present invention.

FIG. 10 is a flowchart illustrating a procedure for translating a hybrid vvol image into a pure file system data stream in accordance with the source swizzling technique of the present invention. The procedure starts at Step 1000 and proceeds to Step 1010 where a block (vbn) of the vvol image is retrieved and, in Step 1020, the block is examined to determine whether it is needed for the image transfer. If the block is not needed, then the procedure returns to Step 1010 and a next block (vbn) is retrieved. Otherwise, the procedure proceeds to Step 1030 where a determination is made as to whether processing is needed for the block (and its constituent information). If so, the block is processed in Step 1040. Essentially, a block requires processing if it contains pvbns. That is, if the block contains pvbn block pointers, those block pointers must be converted to "pure" vvbns. In the illustrative embodiment, the owner map 800 of the aggregate is used to convert a pvbn to a vvbn. To that end, the file system uses a pvbn of the block to index into the owner map at the appropriate entry 810 and access the corresponding vvbn of the vvol image (vvid). If the block does not need processing (or otherwise after Step 1040), the constituent information of the block is provided to construct the output file system data stream 900 in Step 1050 and, in Step 1060, the stream is dispatched to a destination. The procedure then ends at Step 1070.

Vvol blocks may contain different types of data from the file system including user data blocks, system data blocks (such as map file and directory blocks), buffer tree indirect blocks, inode file blocks (containing descriptions of files in the file system), file system information (fsinfo) blocks and volume information (volinfo) blocks. Any of these blocks, except user data blocks and system data blocks, may contain pvbns that in hybrid vvols need to be translated to (logical) vvbns prior to dispatch. Source swizzling uses different detection mechanisms, and different processing, depending on the type of block. For example, indirect blocks are detected by checking the associated file level as non-zero in the block type and level bit mask.

Specifically, blocks that may contain pvbns include buffer tree indirect (e.g., L1, L2) blocks. Here, all 1024 pvbn block pointers are translated to vvbns. Files that are greater than 64 bytes have pvbn block pointers to direct or indirect blocks; those pvbn block pointers must be translated to vvbn block pointers. Other blocks containing pvbns include fsinfo blocks (including assorted pvbns that require translation), volinfo blocks (including assorted pvbns that require translation) and inode file blocks, including inodes that describe other files. Blocks that contain pvbns may not only be associated with the active file system but also with snapshots (and thus they to have to be dealt with in accordance with the source swizzling technique). Accordingly, an aspect of the present invention is directed to efficiently identifying which of these blocks require processing (conversion) and then efficiently converting those blocks (and, in particular, converting the pvbns to vvbns in those blocks).

Two mechanisms are illustratively used to efficiently identify and convert (translate) pvbns of a hybrid vvol into a pure file system data stream of vvbns. These mechanisms comprise bit type information (block type and level bits) and pre-lookup of blocks. The bit type information mechanism may be used to identify and convert pvbn block pointers in indirect blocks and inode file blocks. Here, the reader thread of the volume replication facility 260 accesses the bit type for each vbn needed for the image transfer. As noted, the information is organized as a tuple of vbn, bits and buffer. The block type and level bits are loaded in accordance with a caching mechanism that, in the illustrative embodiment, comprises a block type/level bits file. The bits specify the type of file (regular file, directory, etc.) and the level of the block (L0, L1, L2). The reader reads the bits from the block type/level bits file and passes them to the processor thread.

Armed with type and level of block, the processor thread can determine whether the block needs processing (translation of pvbn-to-vvbn). For example, if the block is a buffer tree indirect block, it requires translation and the processor cooperates with the swizzling engine 265 to process the block pointers in the block. If the block is an inode file level 0 block, a further determination is made as to whether the file is less than or equal to 64 bytes. If so, the block contains data and no conversion is needed. However, if the file is greater than 64 bytes then the block pointers must be converted from pvbns-to-vvbns. Note that the inode file level 0 block is an inode.

Figure 11:
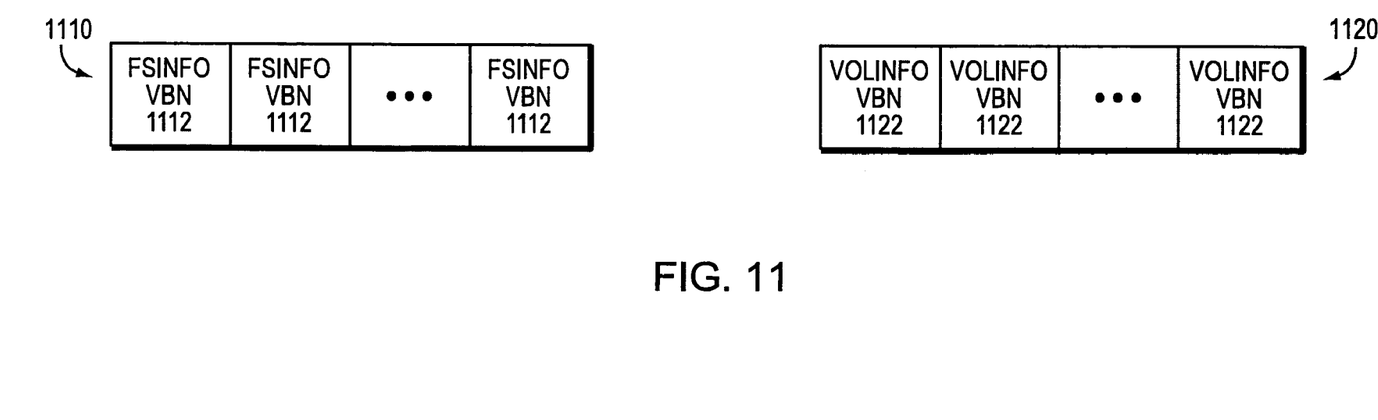
FIG. 11 is a schematic block diagram illustrating an array of volinfo vbns and an array of fsinfo vbns that may be advantageously used with the present invention.

The fsinfo and volinfo blocks are somewhat problematic because they do not have defined block type and level bits. These "special" blocks identify the root of the file system (volinfo block) and each snapshot (fsinfo block). It should be noted that fsinfo vbns are stored in volinfo blocks, wherein a first fsinfo vbn is a pointer that references the active file system and the remaining fsinfo vbns are pointers referencing snapshots. It should be also noted that a source vvol image transfer may include one or more volinfo blocks, depending upon the number of snapshots in the vvol. According to another aspect of the invention, the vbns of these special blocks are determined at the beginning of processing and are stored in data structures as arrays. FIG. 11 is a schematic block diagram illustrating an array 1110 of fsinfo vbns 1112 and an array 1120 of volinfo vbns 1122 that may be advantageously used with the present invention.

These vbns are illustratively pvbns and are organized as arrays, one for pointers to fsinfo blocks and the other for pointers to volinfo blocks.

In accordance with the pre-lookup of blocks mechanism, the arrays are scanned to construct lists of fsinfo pvbns and volinfo pvbns. As each vvol block is read from the container file of the vvol (image) being transferred, the vbn is checked to determine whether it is one of the fsinfo pvbn values or volinfo pvbns values and, if so, is converted to a vvbn. As noted, the owner map 800 of the aggregate is used to convert a pvbn to a vvbn. Note that, in addition to the pvbn-to-vvbn conversion, other "housekeeping" checks are performed during the processing stage, including determining whether the block of vbns is check summed. If so, once the conversion is performed, the checksum must be recomputed for the block. Upon transfer of the image to the destination, the destination swizzling procedure involves checking the checksum to ensure that it is valid.

Because large numbers of pvbns need to be converted to vvbns at a time, the source swizzling technique illustratively includes a message interface "block_pvbn_to_vvbn ( )" to the file system that converts in-place a large number of pvbns in a single file system operation invocation. This provides maximum efficiency. In the illustrative embodiment, the actual conversion operation involves passing a vvid and list of pvbns to the file system via the message interface. In response, the file system "loops" on the list of pvbns, converting each to a vvbn within the vvbn space of the vvol. Here, the file system uses the owner map 800 to convert the pvbns to the vvbns. Note that an optimization involves sorting the list of pvbns to more efficiently look them up in the owner map.

In summary, the novel source swizzling technique involves determining which blocks are needed for the image transfer (such as a source vvol image transfer) and then examining the block type and level bits for each block to determine the type of block so that the locations of the pvbns in the block (if at all) are known. Note that in some cases, an examination of the block itself may be necessary to determine the locations of these pvbns (if at all) such as, e.g., in the case of inode file level 0 blocks or inodes. Once the locations of the pvbns are known, the technique then determines the corresponding vvbns for those pvbns in the vvol and then changes the pvbns-to-vvbns. Lastly, the technique organizes those converted vvbns into a "pure" file system data stream and the stream is sent over the network to the destination in accordance with a volume replication image transfer.

Advantageously, the inventive technique removes intermingling of pvbns and vvbns from a volume (vvol) to thereby generate a pure stream of volume blocks that may be further processed by the destination. The invention additionally provides to the destination information about each block to aid in that processing. Moreover, optimizations such as block type and level bits cache and block-based physical to virtual vbn conversion ensure high efficiency.

While there has been shown and described illustrative embodiments of a technique that translates a hybrid vvol having a file system that contains intermingled vvbns and pvbns into a pure stream of vvbns, it is to be understood that various other adaptations and modifications may be made within the spirit and scope of the invention. For example, in an alternate dual vbn embodiment of the invention, both pvbn and vvbn block pointers are included in the indirect blocks. Accordingly, source swizzling (transformation of pvbn block pointers to vvbn block pointers) is generally not needed for those indirect blocks as the vvbns are already known. In that case, the only modification includes providing placeholders (spaces) for pvbns that essentially mark the pvbns as "unknown". An example of a technique for providing placeholders for unknown pvbns is described in U.S. patent application Ser. No. 10/972,817 titled, *System and Method for Using PVBN Placeholders in a Flexible Volume of a Storage System*, by Ashish Prakash et al. and assigned to Network Appliance, Inc. The rest of the processing function of source swizzling described herein remains the same.

The foregoing description has been directed to specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for transferring data of a hybrid virtual volume of a computer data storage system from a source to a destination, comprising:
   translating intermingled virtual and physical volume block numbers of the hybrid virtual volume into a data stream having only virtual volume block numbers; and
   sending the data stream to a destination computer.

2. The method of claim 1, further comprising:
   using an ownership map to translate the physical volume block numbers into the virtual volume block numbers.

3. The method of claim 2, further comprising:
   employing an ownership map of an aggregate of the data storage system in the using the ownership map.

4. The method of claim 2, further comprising:
   indexing into the ownership map at an appropriate entry using a physical block number.

5. The method of claim 1, further comprising:
   configuring the data stream as a header followed by one or more virtual volume blocks.

6. The method of claim 5, further comprising:
   identifying a virtual volume block number with a first field of the header and identifying a virtual volume block type with a second field of the header.

7. The method of claim 1, further comprising:
   transferring blocks containing pointers and metadata of the storage system to the destination.

8. The method of claim 1, further comprising:
   transferring blocks containing data of the data storage system and blocks containing pointers and metadata of the storage system.

9. A computer data storage system adapted to transfer data of a hybrid virtual volume from a source to a destination, comprising:
   a processor to translate intermingled virtual and physical volume block numbers of the hybrid virtual volume into a data stream having only virtual volume block numbers; and
   a network adapter to send the data stream to a destination computer.

10. The system of claim 9, further comprising:
    the processor to use an ownership map to translate the physical volume block numbers into the virtual volume block numbers.

11. The system of claim 10, further comprising:
    the processor to employ an ownership map of an aggregate of the data storage system in the using an ownership map.

12. The system of claim 10, further comprising:
    the processor to index into the ownership map at an appropriate entry using a physical block number.

13. The system of claim 9, further comprising:
    the processor to configure the data stream as a header followed by one or more virtual volume blocks.

14. The system of claim 13, further comprising:
    the data stream to identify a virtual volume block number with a first field of the header and to identify a virtual volume block type with a second field of the header.

15. The system of claim 9, further comprising:
    the processor to transfer blocks containing pointers and metadata of the storage system to the destination.

16. The system of claim 9, further comprising:
    the processor to transfer blocks containing data of the data storage system and blocks containing pointers and metadata of the storage system.

17. A method for transferring data of a hybrid virtual volume of a data storage system from a source to a destination, comprising:
    retrieving a block of the hybrid virtual volume to transfer;
    determining if the block of the hybrid virtual volume has a pointer to a physical volume block number, and if it does, translating the physical volume block number into a block of an output virtual volume;
    constructing an output stream of the output virtual volume from both the output virtual volume blocks and blocks of the hybrid virtual volume having no pointers to physical volume block numbers; and
    sending the output stream to the destination.

18. A computer readable media, comprising:
    said computer readable media containing instructions for execution on a processor for practice of a method of transferring data of a hybrid virtual volume of a computer data storage system from a source to a destination, the method having the steps of,
    translating intermingled virtual and physical volume block numbers of the hybrid virtual volume into a data stream having only virtual volume block numbers; and
    sending the data stream to a destination computer.

19. A computer readable media, comprising:
    said computer readable media containing instructions for execution on a processor for practice of a method of transferring data of a hybrid virtual volume of a data storage system from a source to a destination, the method having the steps of,
    retrieving a block of the hybrid virtual volume to transfer;
    determining if the block of the hybrid virtual volume has a pointer to a physical volume block number, and if it does, translating the physical volume block number into a block of an output virtual volume;
    constructing an output stream of the output virtual volume from both the output virtual volume blocks and blocks of the hybrid virtual volume having no pointers to physical volume block numbers; and
    sending the output stream to the destination.

* * * * *